(12) United States Patent
Fleps-Dezasse et al.

(10) Patent No.: US 12,491,936 B2
(45) Date of Patent: Dec. 9, 2025

(54) TRAJECTORY PLANNING SYSTEM FOR A VEHICLE AND VEHICLE

(71) Applicant: ZF Friedrichshafen AG, Friedrichshafen (DE)

(72) Inventors: Michael Fleps-Dezasse, Markdorf (DE); Julian King, Rankwell (AT); Stephan Pollmeyer, Friedrichshafen (DE); Lothar Kiltz, Ravensburg (DE); Felix Mesmer, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 175 days.

(21) Appl. No.: 18/447,744

(22) Filed: Aug. 10, 2023

(65) Prior Publication Data
US 2024/0051602 A1 Feb. 15, 2024

(30) Foreign Application Priority Data
Aug. 10, 2022 (DE) .......................... 102022208312.1

(51) Int. Cl.
B62D 6/00 (2006.01)

(52) U.S. Cl.
CPC ............. B62D 6/005 (2013.01); B62D 6/006 (2013.01)

(58) Field of Classification Search
CPC ........ B62D 6/005; B62D 6/006; B62D 6/003; B62D 15/025; B60W 60/001; B60W 50/00; B60W 2050/0075
See application file for complete search history.

(56) References Cited

U.S. PATENT DOCUMENTS 10,124,784 B2 * 11/2018 D'Amato .............. B60W 10/06
11,753,032 B2 * 9/2023 Inoue ................ B60W 60/0015
 701/23

(Continued)

FOREIGN PATENT DOCUMENTS

CN 1808175 A * 7/2006 ......... G01S 7/52004
CN 2927065 A1 * 10/2015 ............. B60C 23/20

(Continued)

OTHER PUBLICATIONS

Office Action dated Feb. 14, 2023 for German Patent Application No. 10 2022 208 312.1 (10 pp.), note: pp. 1 and 2 are English language Explanations to Section C. Result of Determination Document.

Primary Examiner — Redhwan K Mawari
(74) Attorney, Agent, or Firm — Crowell & Moring LLP

(57) ABSTRACT

A trajectory planning system for a vehicle includes a sensor system for measuring an actual curvature on the basis of a respective current yaw rate, a memory containing a target trajectory with target curvatures, wherein the trajectory planning system determines target yaw rates from the target curvature, and a steering system that uses steering variables to obtain target curvatures in actual curvatures. The system determines a respective first actual derivative of the measured respective current actual yaw rate over time and a respective first target derivative of the respective current target yaw rate over time. A correlator determines a respective current delay on the basis of the respective first actual derivatives and the respective first target derivatives in a current yaw rate segment, and a parameter estimator recursively estimates the delay between the target yaw rate and the actual yaw rate on the basis of respective current delay inputs.

17 Claims, 5 Drawing Sheets

(56) References Cited

U.S. PATENT DOCUMENTS

| | | | | |
|---|---|---|---|---|
| 2012/0109412 A1* | 5/2012 | Hanzawa | ............. | B60W 30/02 |
| | | | | 701/1 |
| 2013/0317698 A1* | 11/2013 | Yoon | ................... | B62D 15/025 |
| | | | | 701/41 |
| 2018/0043934 A1* | 2/2018 | Okawa | ................ | G05D 1/0246 |
| 2018/0297633 A1* | 10/2018 | Kasaiezadeh Mahabadi | ............. | |
| | | | | B62D 6/003 |
| 2020/0257301 A1* | 8/2020 | Weiser | ................... | G08G 1/163 |
| 2020/0339152 A1* | 10/2020 | Inoue | ................ | B60W 60/0011 |
| 2023/0192121 A1* | 6/2023 | Zhang | ............... | G06F 18/23213 |
| | | | | 701/25 |

FOREIGN PATENT DOCUMENTS

| | | | | |
|---|---|---|---|---|
| CN | 111930015 A | * | 11/2020 | ........... G05B 13/042 |
| CN | 114684195 A | * | 7/2022 | .......... B60W 60/001 |
| DE | 10 2014 215 243 A1 | | 2/2016 | |
| DE | 10 2020 111 108 A1 | | 10/2020 | |
| DE | 10 2019 006 935 A1 | | 4/2021 | |
| KR | 20200068258 A | * | 6/2020 | ............. G06F 18/25 |

* cited by examiner

TRAJECTORY PLANNING SYSTEM FOR A VEHICLE AND VEHICLE

CROSS-REFERENCE TO RELATED APPLICATION

This application claims priority to German Application No. DE 10 2022 208 312.1, filed on Aug. 10, 2022, the entirety of which is hereby fully incorporated by reference herein.

FIELD

The invention relates to a trajectory planning system for a vehicle that comprises a sensor system for measuring an actual curvature on the basis of a respective current actual yaw rate, a memory that contains a target trajectory with target curvatures that can be set, in which the trajectory planning system is able to determine target yaw rates from the target curvature of the target trajectory, as well as a steering system with steering variables for obtaining the target curvature on the basis thereof.

The invention also relates to a vehicle and a method for operating a trajectory planning system.

BACKGROUND AND SUMMARY

Controlling the trajectory of a vehicle in the context of automated driving or assisted driving requires a great deal of precision with regard to tracking, stability, and durability. The steering system assumes an important role therein as the main interface to the vehicle dynamics in trajectory control. The predefined pathway (target trajectory) is followed using electronic steering axes, in that the necessary steering angle settings in relation to the position of the vehicle, and therefore the target curvature for the intended trajectory, can be accessed in a memory and implemented.

The target curvature is therefore the curvature of the trajectory that the vehicle ideally follows. This is normally centered in a traffic lane.

One challenge in regulating and planning a trajectory is following this target curvature with a high level of precision. This can be difficult, because obtaining the target curvature in the actual curvature involves a sequence that is subject to numerous changing and unknown factors, e.g. contact to the road surface, the nature of the road surface, the tires, etc. These factors make it difficult to select the steering angle such that the desired actual curvature is obtained. These factors must be reliably defined for the entire functional range of the trajectory control.

An object of the invention is to obtain an improved trajectory planning system for a vehicle, a vehicle, and a method for operating such a trajectory planning system.

This object is achieved with a trajectory planning system that has the features as disclosed herein and a vehicle that has the features as disclosed herein, as well as a method that has the features as disclosed herein.

The present disclosure also contain further advantageous features that can be combined to obtain further advantages.

The object is achieved with a trajectory planning system for a vehicle that comprises a sensor system for measuring an actual curvature on the basis of a current actual yaw rate, a memory that contains a target trajectory with target curvatures that can be set, in which the trajectory planning system is able to determine target yaw rates from the target curvatures in the target trajectory, as well as a steering system with steering variables that can be applied to the actual curvatures to obtain target curvatures on the basis thereof, wherein the trajectory planning system is able to determine the respective first actual derivative of the measured respective current actual yaw rate over time and the respective first target derivative of the respective current target yaw rate over time, and wherein there is a correlator for determining a respective current delay on the basis of the respective first actual derivatives and the respective first target derivatives in a current yaw rate segment, and wherein there is a parameter estimator that is able to recursively estimate the delay between the target yaw rate and the actual yaw rate that is to be obtained on the basis of at least the respective current delays, and wherein there is a preview estimator, which is able to determine a preview time on the basis of at least the estimated delay in relation to the actual curvature that is to be obtained, in order to compensate for a delay in obtaining the target curvature in the actual curvature on the basis of the steering variables.

The yaw rate indicates the angular velocity at which the direction a vehicle is pointing changes about a vertical axis.

Sensor systems can contain rotational sensors, etc.

A steering system comprises sensors and actuators or a steering column, etc. as well as steering variables for adjusting the front and rear wheels in order to follow the desired target trajectory with the target curvature.

The first actual derivative is the first temporal actual derivative of the current actual yaw rate over time. The same applies to the target derivative.

A current delay is the lag time to the current time and the current delay corresponds to a lag time calculated over a time period.

The parameter estimator can be model that is to be optimized, e.g. an artificial neural network or a recursive least square estimator that contains parameters, e.g. the nodes in the artificial neural network, that are to be optimized internally.

The invention acknowledges that the sequence for obtaining the target curvature in the actual curvature is subject to numerous changing and unknown factors, e.g. contact to the road surface, the nature of the road surface, the tires, etc. A further difficulty is that there are other delays in the sequence that relate to communication between control units and signal transmission times or elasticity in the wheel suspension.

Because of these unknown factors and the delays in the sequence, the actual curvature (actual curvature value) is delayed with respect to the target curvature (target curvature value), i.e. the actual curvature first reaches the target curvature after a delay.

With the trajectory planning system according to the invention, imprecisions and delays that occur when following the target curvature, which are calculated by the trajectory control, are identified and can be eliminated, thus resulting in an improved overall performance that satisfies high precision requirements.

In particular, the trajectory planning system can determine the preview value directly online on the basis of the actual yaw rate measured under real current conditions such as the speed of the vehicle, or the tires, road surface or environmental effects.

The trajectory planning system according to the invention immediately determines the delays between the target yaw rate and the actual yaw rate and approximates the entire sequence and all delays as a single value, which then forms the preview rate.

The trajectory planning system according to the invention determines the estimated delay between the target yaw rate and the actual yaw rate and can then approximate the entire sequence and all delays in a single value with the preview estimator to obtain the preview time. The preview time itself is determined as a surface in a multidimensional space, as it changes in relation to the speed of the vehicle or the contact between the tires and the road surface.

Trajectory control over the entire functional range can be obtained on the basis of the preview time, which then follows the target curvature more precisely.

This results in a substantial improvement in the trajectory control.

Another embodiment contains a control system for setting steering variables for the steering system, in which the control system is able to set the steering variables for the desired vehicle performance as far in advance as the length of the preview time.

The trajectory planning system thus preferably determines the estimated delay for the actual yaw rate from the measured yaw rate and the target yaw rate calculated from the target curvature, and uses this value for the preview time along the trajectory, such that the steering variables for the trajectory control are set before the desired vehicle performance in accordance with the preview time.

In another embodiment, the trajectory planning system is able to determine a second actual derivative of the measured respective current actual yaw rate over time and a second target derivative of the respective current target yaw rate over time, and to determine the respective current yaw rate segment, wherein the yaw rate segment has a maximum length, in which the second actual derivative and the second target derivative exceed a predefined positive and negative threshold value at least once. The respective yaw rate segment can contain, e.g., a starting point after exceeding the positive or negative threshold values for the second actual and target derivatives, and a predefined length in which it is still possible to complete an online calculation. If the predefined positive and negative threshold values are not exceeded, no yaw rate segment is formed.

Calculating the second derivative of the target yaw rate and the actual yaw rate, and this determination of the current yaw rate segment, ensures that the time horizon is suitable for the calculation of the estimated delay. For this reason, the second actual and target derivatives are used to determine suitable yaw rate segments, in that it is checked whether the second actual and target derivatives of the target and actual yaw rates exceed both a positive and a negative threshold value during the current yaw rate segment, i.e. suitable yaw rate segments are determined for the calculation of the estimated delay by checking the second actual and target derivatives against a positive and a negative threshold value.

Checking against positive and negative threshold values ensures that the respective current delay can be determined in an optimal manner on the basis of the correlator, e.g. using a cross-correlation, i.e. in that the first actual and target derivatives ofm a (sine) wave in the current yaw rate segment, for example. The values for the first actual and target derivatives in the current yaw rate segment can therefore be used for calculating the current delay. This ensures that a short time period, which can be calculated online in the vehicle, for example, is also optimal for the use of a correlation. The current delay is then input in the parameter estimator to determine the estimated delay.

The parameter estimator in another embodiment can also recursively estimate the delay on the basis of the respective current delays and vehicle parameters, wherein the vehicle parameters comprise at least the speed of the vehicle. The current delay is then determined recursively on the basis of the vehicle parameters and the current delay.

In another embodiment, the parameter estimator is able to recursively estimate the delay on the basis of the respective current delays and vehicle parameters, as well as environmental data inputs, wherein the vehicle parameters comprise at least the speed of the vehicle. The environment data can comprise at least the nature of the road surface and/or a detected frictional coefficient.

Relevant factors are thus taken into account, such as the speed of the vehicle, frictional coefficient, the nature of the road surface, and other environmental and vehicle parameters.

As a result, the parameter estimator recursively determines the estimated delays on the basis of current delays as well as environmental data and vehicle parameters. The current delays can be more precisely determined on the basis of these current factors.

The parameter estimator can also form a recursive least square estimator. In particular, the recursive least square estimator can contain a "forgetting factor" with which older current delays, i.e. outdated results, are "forgotten."

This results in a quick and reliable determination of the estimated delays. The recursiveness allows for online use with current data while retaining the complexity in each recursion step. In particular, a forgetting factor can be incorporated that deletes outdated results, i.e. older delays. Historic data may become irrelevant with regard to optimization, whereas current data are then given a higher priority.

The parameter estimator can form an artificial neural network, containing nodes that are still to be determined, for example.

The parameter estimator in another embodiment also contains parameters that are to be optimized internally for determining the estimated delay output. These can be the nodes, for example, in the artificial neural network forming the parameter estimator. The parameter estimator is then preferably able to use the internal parameters, i.e. the nodes, for estimating future delay outputs once these internal parameters have been optimized to a certain level of precision.

This means that the parameter estimator is only used as a known spatial optimization function after reaching a certain level, in which the input data are input, and the current delays are output on the basis thereof with the optimized nodes, if the parameter estimator is an artificial neural network.

The trajectory planning system can also determine the preview time in realtime. The various current factors such as the speed of the vehicle, frictional coefficient, nature of the road surface, and other environmental factors can be taken into account in realtime for this. This makes it possible to improve the trajectory control in realtime.

In another embodiment, the correlator is able to determine the current delay using cross-correlation of the respective first actual derivatives and the respective first target derivatives in the current yaw rate segment. This also enables a reliable determination of a current delay in relatively short time spans of ca. 5 seconds, or ca. 500 data points, because the second target and actual derivatives exceed predefined positive and negative threshold values, such that it is ensured that the first actual and target derivatives in the yaw rate segment are at least substantially wave-shaped.

In another embodiment, the trajectory planning system is only able to determine a new estimated delay using the parameter estimator if there is a newly determined current delay.

The parameter estimator is basically only used if a new current delay, and therefore a new current yaw rate segment, are available. This prevents overloads to the vehicle's computing capacity. This is of particular advantage with autonomous and partially autonomous vehicles.

The object of the invention is also achieved with a vehicle that has the trajectory planning system described above. This can be a partially autonomous or an autonomous vehicle.

In another embodiment, the vehicle can have a receiver for receiving target curvatures that are to be set at predefined locations from one or more vehicles that are ahead of it, and/or a trajectory planning system for generating a target trajectory at least on the basis of navigation data and environmental data. This can be a trailing vehicle that is following a lead vehicle, or an autonomous vehicle that obtains the target trajectories on the basis of navigation data and environmental data obtained from a sensor system. This trajectory planning system only requires a small amount of the computing capacity in an autonomous vehicle, which otherwise requires a large portion of the available computing capacity.

The objective of the invention is also achieved with a method for operating a trajectory planning system for a vehicle, comprising the steps:
  measuring an actual curvature on the basis of a respective current actual yaw rate;
  providing a target trajectory with target curvatures that are to be set, and determining target yaw rates from the target curvature in the target trajectory;
  providing a steering system with steering variables for implementing the target curvatures on the basis of the steering variables;
  determining the respective first actual derivative for the measured respective current actual yaw rate and the respective first target derivative for the respective current target yaw rate over time;
  determining a respective current delay on the basis of the respective first actual derivatives and the respective first target derivatives in a current yaw rate segment with a correlator;
  recursive estimation of a delay between the target yaw rate and the actual yaw rate on the basis of respective current delays that are input into a parameter estimator;
  determining a preview time on the basis of at least the estimated delay in relation to the actual curvature that is to be set by a preview estimator in order to compensate for a delay in obtaining the target curvature in the actual curvature that is to be set with the steering variables.

The trajectory planning system can be that described above. The advantages of the trajectory planning system can also be obtained with the method.

Further properties and advantages of the present invention can be derived from the following descriptions in reference to the drawings. Variations thereof can be derived by the person skilled in the art without abandoning the scope of the invention defined in the following claims.

DETAILED DESCRIPTION

Figure 1:
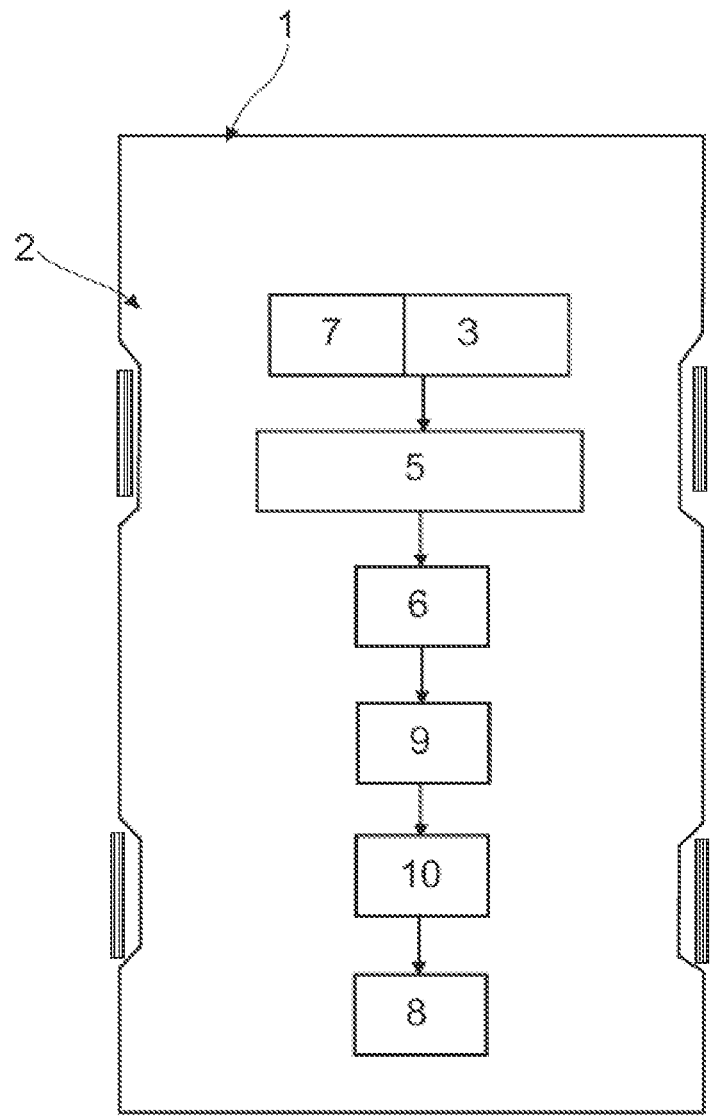
FIG. 1 shows a vehicle that has a trajectory planning system according to the invention.

FIG. 1 shows a schematic illustration of a vehicle 1 that has a trajectory planning system according to the present disclosure.

This vehicle contains a sensor system 3. The sensor system 3 is able to determine the actual curvature on the basis of the actual yaw rate. The sensor system 3 can contain turning angle sensors and other sensors for detecting the actual yaw rate.

The trajectory planning system 2 also comprises a memory 7 that contains a target trajectory with target curvatures that are to be set. The target yaw rate is determined from the target curvature for the target trajectory.

There is also a steering system 8, which has steering variables for implementing the target curvature in the actual curvature on the basis of the steering variables. The steering system 8 can also contain turning actuators, sensors, etc.

If the vehicle 1 is an autonomous vehicle, it can contain a trajectory generating system (not shown) for generating a target trajectory from navigation data and environmental data, including data regarding other road users and stationary objects. The target yaw rates for the target trajectory are generated on the basis of the target trajectories and their target curvatures, and stored in the memory 7.

The vehicle 1 can also be a trailing vehicle. In this case, it receives the target yaw rates that are to be set from a leading vehicle that has the same target trajectory. The vehicle 1 can have a receiver (not shown) for this, e.g. for receiving the target curvature via a wireless connection (V2V connection).

The trajectory planning system determines the respective first actual derivatives of the measured respective current actual yaw rates and the respective first target derivatives of the respective current target yaw rates over time. The trajectory planning system 2 can have a processor (not shown) for this.

The trajectory planning system 2 also determines a second actual derivative of the measured respective current actual yaw rate over time and a second target derivative of the respective current target yaw rate over time. A respective current yaw rate segment 4 (FIG. 2) is also determined, in which the second actual derivative and the second target derivative exceed a predefined positive and negative threshold value at least once. The yaw rate segment 4 (FIG. 2) has a maximum length for this.

The length of this yaw rate segment 4 (FIG. 2) is selected such that the current delay can be calculated with a cross-correlation.

The determination of this yaw rate segment 4 (FIG. 2) ensures that the first actual derivative and first target derivative assume a wave-shaped course over the yaw rate segment 4, in particular in the form of a sine wave, thus allowing for a subsequent cross-correlation.

The yaw rate segment 4 (FIG. 2) can start after exceeding the positive or negative threshold value in the second actual and target derivatives, and be long enough for an online calculation.

The amount of computing and memory capacity needed for an online application has been established. A length of ca. 5 seconds or ca. 500 data points is preferably selected, because this satisfies both conditions.

Figure 2:
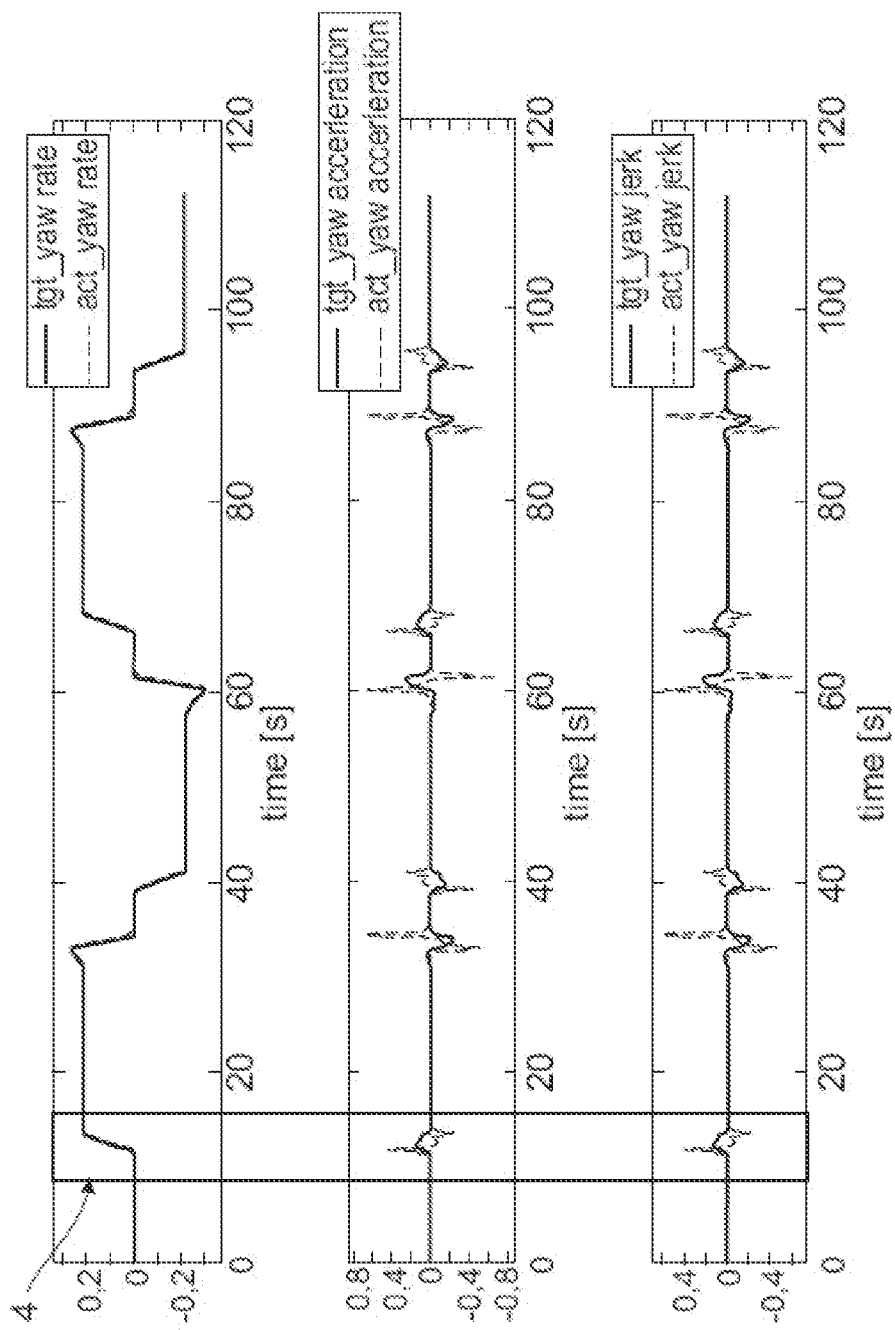
FIG. 2 shows examples of actual yaw rates and target yaw rates and their derivatives.

The upper diagram in FIG. 2 shows target yaw rates (tgt_yaw rate) and corresponding actual yaw rates (act_yaw rate) over time.

The first temporal derivative of the actual yaw rate (act_yaw acceleration) over time and the first target derivative (tgt_yaw acceleration) of the target yaw rate are shown in the middle diagram.

The second derivative of the actual yaw rate (act_yaw jerk) over time, and the second target derivative (tgt_yaw jerk) are shown in the lower diagram.

The current yaw rate segment 4 in which the second actual derivative and the second target derivative each exceed a predefined positive and negative threshold at least once is also determined, wherein this current yaw rate segment 4 has a maximum length.

This ensures that the first actual derivative and first target derivative assume a wave-shaped course over the yaw rate segment 4, in particular in the form of a sine wave, thus enabling a subsequent cross-correlation.

The trajectory planning system 2 also contains a correlator 5 that uses a cross-correlation on the first actual derivative and the first target derivative in the yaw rate segment 4, i.e. the segment in which the first actual derivative and the first target derivative form a sine wave. Another correlator can also be used.

A current delay for the yaw rate segment 4 is determined with the cross-correlation.

The trajectory planning system 2 also has a parameter estimator, specifically in the form of a recursive least squares estimator 6. This produces results quickly and reliably. The recursiveness allows for online use with current data while maintaining the same complexity in each recursion step. The parameter estimator can also form an artificial neural network.

The respective current delay for the current yaw rate segment 4 is input to the recursive least squares estimator 6. Internal parameters that are to be optimized are contained in the recursive least squares estimator 6 for determining the estimated delay.

The recursive least squares estimator 6 also contains vehicle parameters, in particular the speed of the vehicle, and environmental data such as the nature of the road surface and frictional coefficients.

A current delay is then recursively determined by the recursive least squares estimator 6 on the basis of the vehicle parameters and the environmental data, as well as the current delay.

This current delay can be determined online with a reasonable amount of computing and memory capacity.

A forgetting factor can be used to delete outdated results.

The recursive least squares estimator 6 can also use the parameters that are to be optimized internally for future estimates of the delay, once these have reached an intended level of precision.

This means that the recursive least squares estimator 6 is only used as a known spatial function once it has reached a certain level, to which the input data are input, and the current delay is then determined as the output.

The trajectory planning system 2 then only determines a new estimated delay with the recursive least squares estimator 6 if a new current delay and a new current yaw rate segment 4 have been determined. Because the previous current delay has been used up until this point, realtime calculation using excessive computing capacity is unnecessary. This reduces the overall use of the vehicle's computing capacity. This is of particular advantage with autonomous and partially autonomous vehicles.

There is also a preview estimator 9 for determining a preview time on the basis of at least the estimated delay, with which a delay in obtaining the target curvature in the actual curvature that is to be set using the steering variables can be compensated for.

There is also a control system 10 for setting the steering variables for the steering system 8. The control system 10 sets the steering variables for the desired vehicle performance as far in advance as the length of the preview time.

A delay in the sequence in which the target curvature is obtained in the actual curvature resulting from a variety of changing and unknown factors, e.g. contact to the road surface, nature of the road surface, and frictional coefficient, is compensated for in the trajectory planning system 2 according to the present disclosure. Delays in this sequence due to the time necessary for communication between control units and signal transfer, or the elasticity of the wheel suspension, can also be compensated for.

The trajectory planning system 2 takes into account the fact that the delays that occur when controlling how a vehicle performs in a curve can vary and are dependent on the speed of the vehicle and the environmental parameters. This results in an improved overall performance of the system. Trajectory control can be improved by compensating for these factors.

The trajectory planning system 2 according to the present disclosure ensures that the high level of requirements regarding tracking precision, stability and durability in trajectory control for a vehicle in the context of automated or assisted driving with regard to performance in a curve over the entire range of trajectory control are satisfied.

An approximation of the sequence and all delays between the target yaw rates and the actual yaw rates can be obtained by the trajectory planning system 2 with a value for the preview time.

Figure 3:
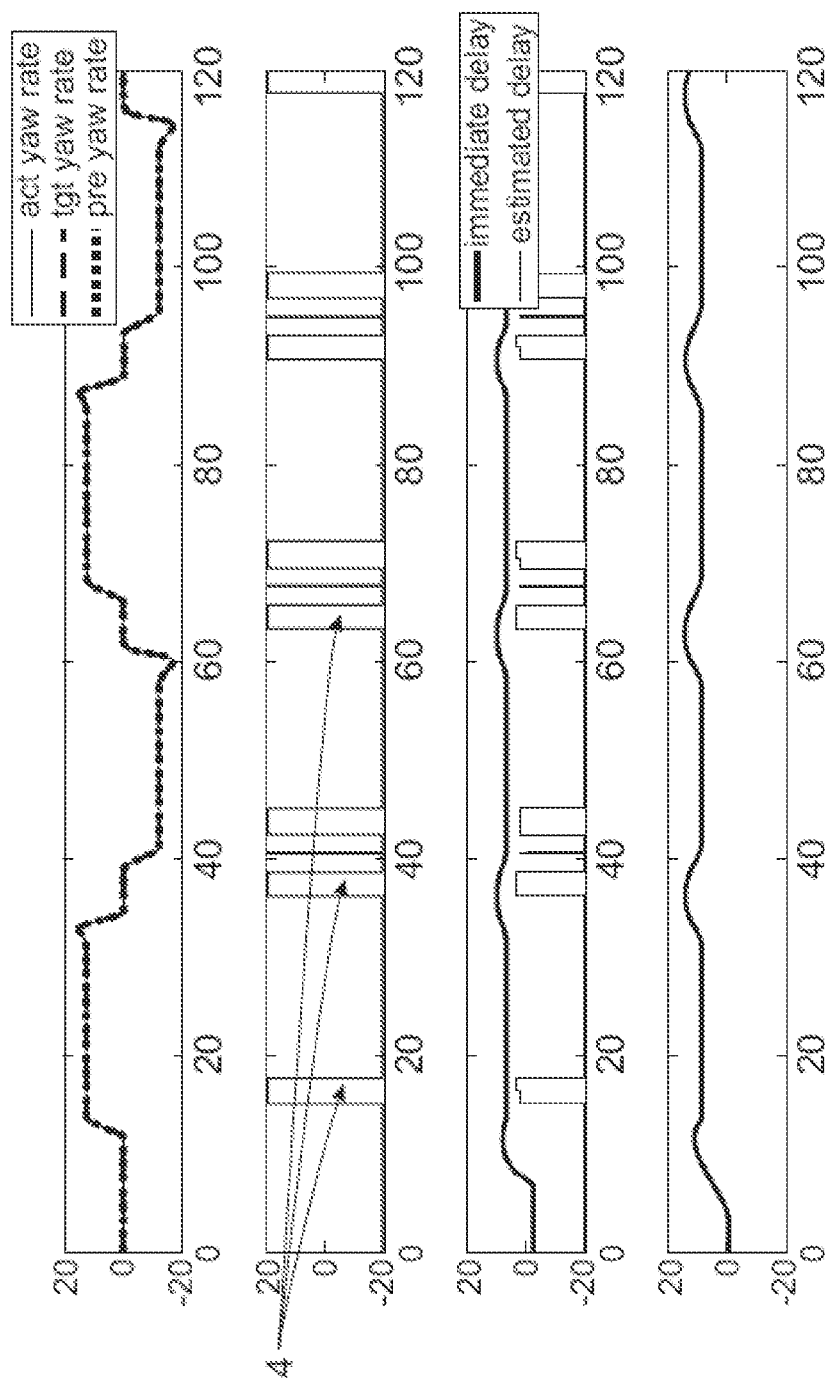
FIG. 3 shows an example of how to operate the trajectory planning system.

FIG. 3 shows an example of an online estimation of the delay and the preview time.

The first diagram shows the target yaw rates (tgt yaw rate) and actual yaw rates (act yaw rate) as well as the preview times (pre yaw rate).

The current yaw rate segments 4 in which a positive and negative threshold value for the second derivatives of the target and actual yaw rates are exceeded, are shown in the second diagram.

The current delays (immediate delay) and the estimated delays (estimated delay) can be seen in the third diagram.

The speed of the vehicle is indicated in the fourth diagram.

Figure 4:
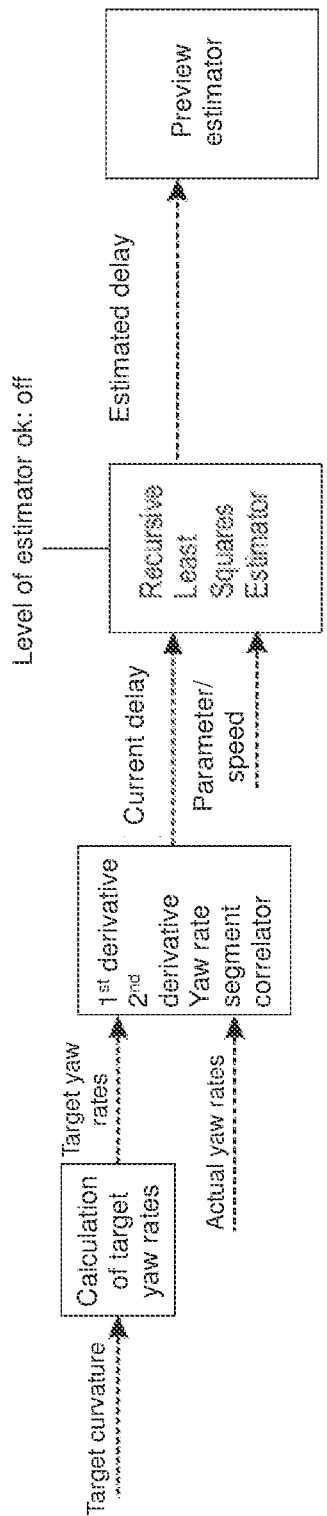
FIG. 4 shows a schematic illustration of the method.

FIG. 4 shows an overview of the trajectory planning system 2 and the method associated therewith.

The target curvature that is to be set is stored in a memory 7 in the first step. The target yaw rate is subsequently determined therefrom. The actual curvature is also obtained on the basis of the respective current actual yaw rate.

The first actual derivative and the first target derivative of the actual yaw rate and the target yaw rate, and the second actual derivative and second target derivative of the actual and target yaw rates are determined over time in the second step. A current yaw rate segment 4 is formed where the second actual derivative and second target derivative each exceed a positive and negative threshold value. These current yaw rate segments 4 must be long enough for an online calculation.

A cross-correlation of the first actual derivatives and first target derivatives containing the current yaw rate segments 4 is carried out in the third step in order to determine current delays.

The current delay, along with at least the speed of the vehicle and the frictional coefficient or nature of the road surface are input as parameters to the recursive least squares estimator 6, which then estimates the delay on the basis of at least some previous calculations.

This recursive least squares estimator 6 forms a recursive function with parameters that are to be determined. After a certain level has been reached by the recursive least squares estimator 6, it is only used as an optimizing spatial function in which the current delay and the vehicle speed as well as parameters such as the frictional coefficient are input, based on which the current delay is determined.

The preview time is determined on the basis of at least the estimated delay in relation to the actual curvature that is to be set in the fourth step, in order to compensate for a delay in obtaining the target curvature in the actual curvature through the use of steering variables.

Figure 5:
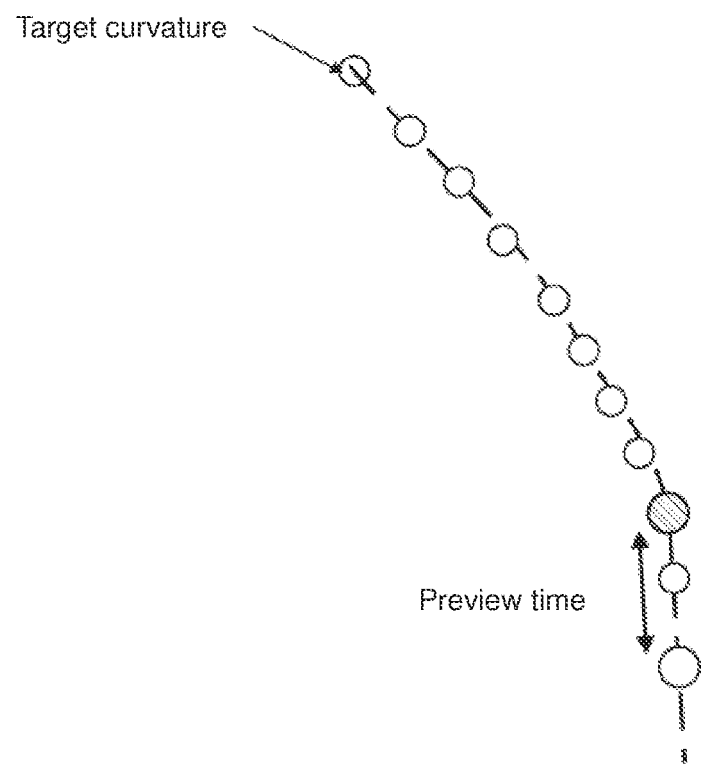
FIG. 5 shows how the control system uses the preview time.

FIG. 5 shows a fifth step. The steering variables for the steering system 3 are set by the control system 10 in this fifth step, such that the steering variables are set for the desired vehicle performance as far in advance as the length of the preview time.

LIST OF REFERENCE SYMBOLS

1 vehicle
2 trajectory planning system
3 sensor system
4 yaw rate segment
5 correlator
6 recursive least squares estimator
7 memory
8 steering system
9 preview estimator
10 control system

The invention claimed is:

1. A trajectory planning system for a vehicle comprising:
a sensor system for measuring an actual curvature on a basis of a respective current actual yaw rate;
a memory containing a target trajectory with target curvatures;
a steering system with steering variables configured to be applied to an actual curvature to obtain the target curvatures using the steering variables; and
at least one processing device configured to:
determine target yaw rates from the target curvature in the target trajectory;
determine a respective first actual derivative of the measured respective current actual yaw rate over time and a respective first target derivative of the respective current target yaw rate over time;
determine a respective current delay on a basis of the respective first actual derivative and the respective first target derivative in a current yaw rate segment;
recursively estimate an estimated delay between the target yaw rate and the actual yaw rate on a basis of respective current delay inputs; and
determine a time period on a basis of at least the estimated delay in relation to the actual curvature, in order to compensate for a delay while obtaining the target curvature by applying the steering variables to the actual curvature.

2. The trajectory planning system according to claim 1, comprising:
a control system configured to set the steering variables for the steering system, wherein the control system is configured to set the steering variables for the desired vehicle performance in advance of the time period.

3. The trajectory planning system according to claim 1, wherein the at least one processing device is configured to:
determine a second actual derivative of the measured respective current actual yaw rate over time and a second target derivative of the respective current target yaw rate over time; and
determine the respective current yaw rate segment, wherein the respective current yaw rate segment has a maximum length in which the second actual derivative and the second target derivative each exceed a predefined positive and negative threshold value at least once.

4. The trajectory planning system according to claim 1, wherein the at least one processing device is configured to:
recursively estimate the estimated delay on a basis of respective current delay and vehicle parameters, wherein the vehicle parameters comprise at least the speed of the vehicle.

5. The trajectory planning system according to claim 1, wherein the at least one processing device is configured to:
recursively estimate the estimated delay on a basis of respective current delays and vehicle parameters, as well as environmental input data, wherein the vehicle parameters comprise at least the speed of the vehicle.

6. The trajectory planning system according to claim 5, wherein the environmental data comprise at least a nature of a road surface.

7. The trajectory planning system according to claim 5, wherein the environmental data comprise at least a detected frictional coefficient.

8. The trajectory planning system according to claim 1, wherein the at least one processing device is configured to:
provide a recursive least squares estimator.

9. The trajectory planning system according to claim 8, wherein the recursive least squares estimator contains a forgetting factor for deleting outdated results.

10. The trajectory planning system according to claim 1, wherein the at least one processing device is configured to:
provide an artificial neural network.

11. The trajectory planning system according to claim 1, wherein the at least one processing device is configured to:
optimize internal parameters for estimating the estimated delay; and
use the optimized internal parameters for future estimations of the estimated delay
once the optimized internal parameters reach a certain level of precision.

12. The trajectory planning system (according to claim 1, wherein the at least one processing device is configured to:
determine the time period in realtime.

13. The trajectory planning system according to claim 1, wherein the at least one processing device is configured to:
determine the current delay by cross-correlation of the respective first actual
derivatives and the respective first target derivatives in the current yaw rate segment.

14. The trajectory planning system according to claim 1, wherein the at least one processing device is configured to:
determine a new estimated delay in response to a newly determined current delay.

15. A vehicle comprising:
the trajectory planning system according to claim 1; and
a receiver configured to receive the target curvature at predefined locations from one or more leading vehicles.

16. A vehicle comprising:

the trajectory planning system according to claim 1; and a trajectory generating system configured to generate the target trajectory on a basis of at least navigation data and environmental data.

17. A method for trajectory planning comprising:

measuring an actual curvature on a basis of a respective current actual yaw rate;

providing a target trajectory with a target curvature, and determining target yaw rates from the target curvature in the target trajectory;

providing a steering system with steering variables for implementing the target curvatures on the basis of the steering variables;

determining a respective first actual derivative for the measured respective current actual yaw rate and a respective first target derivative for the respective current target yaw rate over time;

determining a respective current delay on a basis of the respective first actual derivative and the respective first target derivative in a current yaw rate segment with a correlator;

recursively estimating an estimated delay between the target yaw rate and the actual yaw rate on a basis of the respective current delay input into a parameter estimator; and determining a time period on a basis of at least the estimated delay in relation to the actual curvature by a preview estimator in order to compensate for a delay in obtaining the target curvature by applying the steering variables to the actual curvature.

* * * * *